Figure 1:
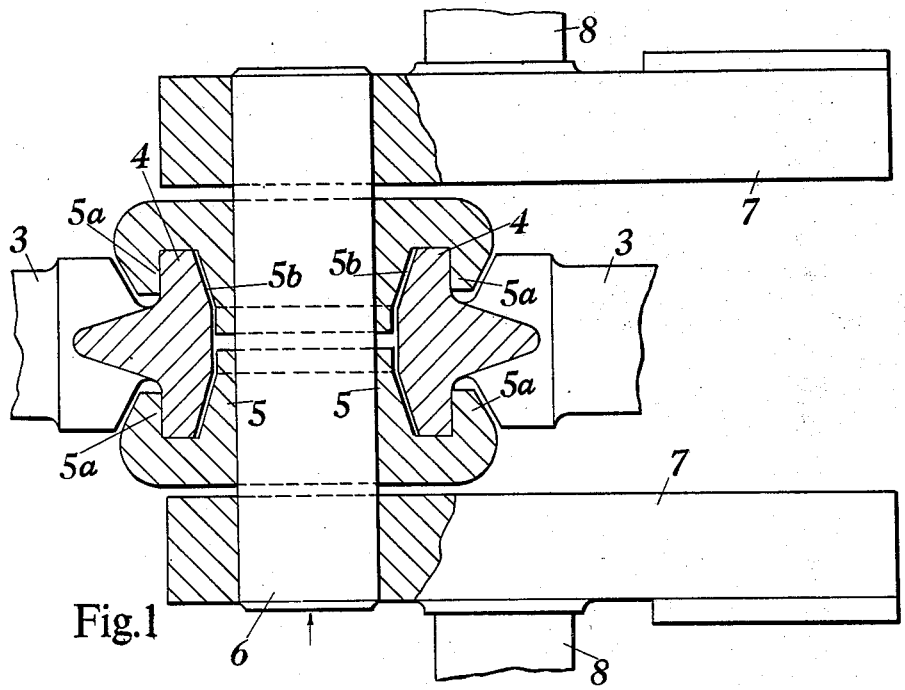

June 2, 1953

G. E. MANLEY 2,640,363

MECHANISM FOR CONVERTING RECIPROCATING
MOTION INTO ROTARY MOTION
Filed July 17, 1950

Inventor
G. E. Manley

Patented June 2, 1953

2,640,363

UNITED STATES PATENT OFFICE 2,640,363

MECHANISM FOR CONVERTING RECIPROCATING MOTION INTO ROTARY MOTION

Gilbert Edgar Manley, Henley-in-Arden, England

Application July 17, 1950, Serial No. 174,178
In Great Britain February 20, 1948

3 Claims. (Cl. 74—50)

This invention relates to mechanism for converting reciprocating motion into rotary motion, and of the kind in which a bearing block associated with a crank pin on a rotary part slidably engages a transversely arranged link associated with a reciprocating part.

In mechanism of the above kind it is usual to mount the bearing block in an elongated slot in the link, but with such an arrangement there are set up forces which cause the leading edge of the block to bite into the adjacent bearing face of the slot and so occasion undue wear.

The object of the present invention is to obviate the defect above referred to.

The invention comprises a mechanism of the kind specified, in which the transversely arranged link is provided with oppositely arranged and externally disposed longitudinal bearing surfaces, and in which the bearing block is adapted to embrace the link and is provided with complementary bearing surfaces arranged in sliding relationship with the bearing surfaces of the link.

The invention is especially (though not exclusively) applicable to the crank mechanism of an internal combustion engine of the kind in which a pair of opposed cylinders have a common axis, and in which the pistons are interconnected to a crank mechanism located between the adjacent ends of the cylinders.

Figure 2:
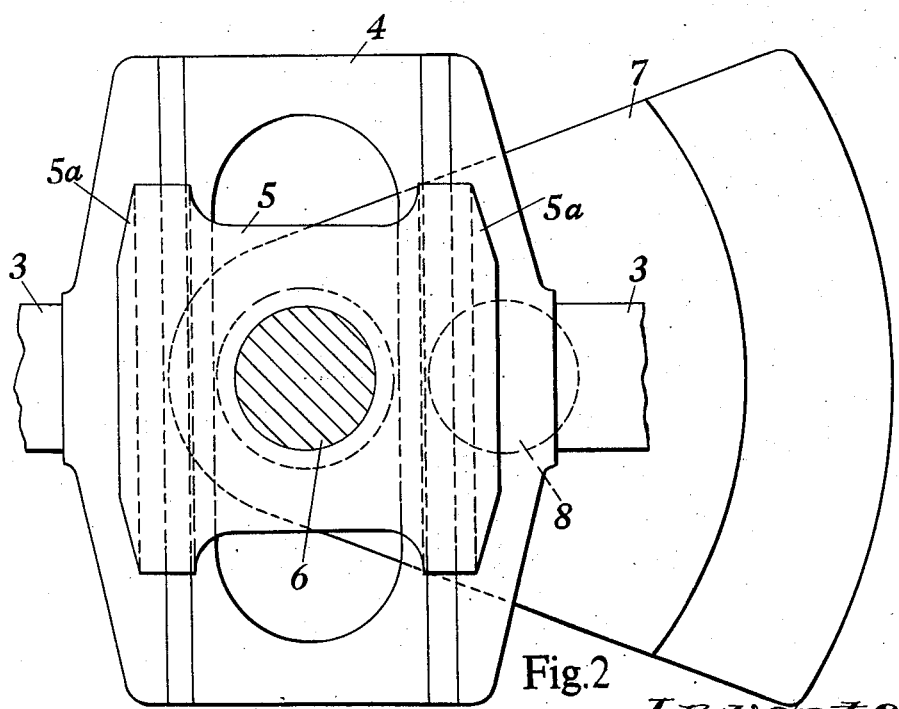

In the drawings:

Figure 1 is a fragmentary plan view and Figure 2 is a sectional side view of a crank mechanism embodying the invention.

According to the illustrated embodiment of the invention piston rods 3 are connected to the opposite sides of a rectangular and longitudinally slotted link 4 the major axis of which is arranged at right angles to the axis of reciprocation of the piston rods 3.

The sides of the slotted link 4 are adapted to be embraced by the respective inwardly turned jaws 5ª bounding oppositely disposed recesses 5ᵇ formed in a bearing block 5, the latter being composed of two similar parts turnably mounted on the crank pin 6 connecting the crank cheeks 7 which are secured on the main shafts 8 of the engine.

The link 4 is provided with oppositely arranged and externally disposed longitudinal bearing surfaces which co-operate with complementary bearing surfaces formed by the inner faces of the jaws 5ª on the block 5, so that the block and the link are associated in a sliding relationship such as to enable the reciprocating motion of the piston rods 3 to be converted into a rotary movement of the main shafts 8.

With the arrangement above described it is found that the forces set up tend to move the leading edge of the block 5 away from the adjacent bearing surface of the link 4 so that there is no tendency for the said leading edge to bite into the said bearing surface.

It is to be understood that the invention is not limited to its application to internal combustion engines, as it is applicable to crank mechanisms for other purposes where analogous conditions obtain.

Having thus described my invention what I claim as new and desire to secure by Letters Patent is:

1. A mechanism for converting reciprocatory motion into rotary motion, comprising in combination a rotatable part, a crank pin on the rotatable part, a bearing block rotatably mounted on and surrounding the crank pin, and a slotted link through which the crank pin extends, and which is embraced by the bearing block, the link having external bearing surfaces disposed longitudinally at opposite sides of the crank pin in planes transverse to the plane of the link, and the bearing block having complementary bearing surfaces disposed at opposite sides of the crank pin in sliding contact with the external bearing surfaces of the link.

2. A mechanism for converting reciprocatory motion into rotary motion, comprising in combination a rotatable part, a crank pin on the rotatable part, a bearing block rotatably mounted on and surrounding the crank pin, and a slotted link through which the crank pin extends, and which is embraced by the bearing block, the link having external bearing surfaces disposed longitudinally at opposite sides of the crank pin in planes transverse to the plane of the link, and the bearing block being recessed to provide thereon, at opposite sides of the crank pin, inturned jaws which are formed at their inner sides with bearing surfaces complementary to, and in sliding contact with, the external bearing surfaces of the link.

3. A mechanism in accordance with claim 2, including a piston rod rigidly connected to said slotted link and extending perpendicular to the directions of the bearing surfaces of said link, the bearing surfaces of said link and block being so positioned that, during movement of said piston rod toward said crank pin, the bearing thrust between said link and block is exerted substantially entirely upon those complementary bearing surfaces lying beyond said crank pin from said piston rod.

GILBERT EDGAR MANLEY.

References Cited in the file of this patent

UNITED STATES PATENTS

| Number | Name | Date |
|--------|------|------|
| 813,736 | Pendleton | Feb. 27, 1906 |
| 829,735 | Ramsey | Aug. 28, 1906 |
| 1,343,407 | Rottel | June 15, 1920 |
| 1,787,173 | Samuels | Dec. 30, 1930 |